(12) United States Patent
Shadwell, Jr. et al.

(10) Patent No.: US 8,459,559 B2
(45) Date of Patent: Jun. 11, 2013

(54) AUDIO JACK ENABLED SYNTHETIC BARCODE MODULE

(75) Inventors: Percy F. Shadwell, Jr., Jacksonville, FL (US); Randy McGill, St. Augustine, FL (US)

(73) Assignee: Randy D. McGill, St. Augustine, FL (US)

( * ) Notice: Subject to any disclaimer, the term of this patent is extended or adjusted under 35 U.S.C. 154(b) by 3 days.

(21) Appl. No.: 13/283,685

(22) Filed: Oct. 28, 2011

(65) Prior Publication Data

US 2012/0061462 A1    Mar. 15, 2012

Related U.S. Application Data

(63) Continuation-in-part of application No. 12/897,812, filed on Oct. 5, 2010, which is a continuation of application No. 12/616,881, filed on Nov. 12, 2009, now Pat. No. 8,196,833, which is a continuation-in-part of application No. 12/034,448, filed on Feb. 20, 2008, now Pat. No. 8,042,741, which is a continuation-in-part of application No. 11/160,514, filed on Jun. 27, 2005, now Pat. No. 7,380,725.

(51) Int. Cl.
*G06K 7/10*    (2006.01)

(52) U.S. Cl.
USPC ................................ 235/472.01; 235/462.01

(58) Field of Classification Search
USPC ............. 235/462.01–462.25, 472.01–472.03, 235/491, 494, 455
See application file for complete search history.

(56) References Cited

U.S. PATENT DOCUMENTS

| | | | |
|---|---|---|---|
| 2002/0074404 A1* | 6/2002 | Drumm | 235/462.01 |
| 2006/0060652 A1* | 3/2006 | Trifilo | 235/462.01 |
| 2008/0149721 A1* | 6/2008 | Shadwell | 235/462.01 |
| 2009/0261166 A1* | 10/2009 | Lawson et al. | 235/449 |
| 2012/0241519 A1* | 9/2012 | Lawson et al. | 235/440 |

* cited by examiner

*Primary Examiner* — Thien M Le
(74) *Attorney, Agent, or Firm* — Mark Young, P.A.

(57) ABSTRACT

A coupon management system includes a synthetic barcode module. The synthetic barcode module comprises light management components and a controller. The light management components include an LED operating as both an optical receiver and an optical emitter The controller interfaces with a compatible electronic device such as a cell phone via an analog audio interface, receives analog audio signals corresponding to coupon barcodes, produces timing data for managing optical output, determines if the received light pulses correspond to scanner output, and using the timing data outputs driver signals to cause the light management module to emit light pulses that emulate light reflected from a scanned barcode to communicate the coupon barcode optically.

20 Claims, 11 Drawing Sheets

Scan

AUDIO JACK ENABLED SYNTHETIC BARCODE MODULE

RELATED APPLICATIONS

This application is a continuation in part and claims the benefit of priority of pending U.S. Nonprovisional application Ser. No. 12/897,812 filed Oct. 5, 2010, the entire contents of which are incorporated herein by this reference and made a part hereof, which is a continuation in part of and claims the benefit of priority of U.S. Nonprovisional application Ser. No. 12/616,881, filed Nov. 12, 2009, the entire contents of which are incorporated herein by this reference and made a part hereof, which is a continuation in part and claims the benefit of priority of U.S. Nonprovisional application Ser. No. 12/034,448, filed Feb. 20, 2008, which is a continuation in part and claims the benefit of priority of U.S. Nonprovisional application Ser. No. 11/160514, filed Jun. 27, 2005, the entire contents of which are incorporated herein by this reference and made a part hereof.

FIELD OF THE INVENTION

This invention generally relates to barcodes, and more particularly, to a system and method for receiving barcode data as an audio output signal stream from an electronic device, decoding the signal stream and communicating the barcode data to a barcode reader via optical communication.

BACKGROUND

A point of sale (POS) terminal comprises hardware and software used for checkouts. Such systems are widely used in retail establishments, including, but not limited to grocery stores, restaurants and countless other places of business. Among the various types of equipment used by POS terminals is a barcode reader (or barcode scanner).

As is well known, a barcode reader optically senses a barcode image and produces electronic signals corresponding to the sensed image. One type of reader is a pen-type reader that consists of a light source and a photodiode that are placed next to each other in the tip of a pen or wand. The photodiode measures the intensity of the light from the light source that is reflected back by white spaces in the barcode. Processing circuitry generates a waveform corresponding to the widths of the bars and spaces in the barcode. The waveform is then decoded.

Another type of reader is a digital camera or CCD reader, which uses an array of light sensors to measure the intensity of emitted ambient light from the bar code immediately in front of it. A voltage pattern identical to the pattern in a bar code is generated in the reader by sequentially measuring the voltages across each sensor.

Neither a pen-type nor a CCD/camera-type reader is the most popular type of reader for POS terminals. Laser scanners predominate. In general, they work the same way as pen type readers except that they use a laser beam as the light source and typically employ either a reciprocating mirror or a rotating prism to scan the laser beam back and forth across the bar code. As with the pen type reader, a photodiode measures the intensity of the light reflected back from the bar code. In both pen readers and laser scanners, the light emitted by the reader is rapidly varied in brightness with a data pattern and the photodiode receive circuitry is designed to detect only signals with the same modulated pattern. Laser scanners operate quickly and reliably. With an arrangement of mirrors and lenses, a laser scanner station of a POS system effectively scans barcodes on merchandise so long as the barcode is passed through the scanning field, even though the barcode may not directly face the scanner and may never come to a complete rest in the scanning field. Pen and CCD scanners cannot do this.

While conventional laser scanners are superb at reliably scanning printed barcodes, for various reasons they cannot reliably scan barcodes displayed as images on electronic displays. Some CCD/camera type scanners are useful for scanning barcodes displayed as images on electronic displays; however, for various reasons, these types of scanners are not in widespread use. One reason may be that they require the barcode to be stationary immediately in front of the scanner. Such precise positioning requirements would cause the grocery checkout process to grind to a halt. Another reason is relatively high cost. Most retailers have little or no reason to abandon their fully functional laser scanners for more temperamental and costly CCD/camera type scanners.

In recent years, with the proliferation of cell phones, various mobile applications have been conceived to help manage coupons. A goal of such applications is facilitating access to coupons via a shopper's cell phone. No one would dispute that on-demand mobile access to coupons would be highly desirable. The problem with these applications is that they do not work well or at all with the vast majority of existing POS systems. A coupon barcode displayed on a cell phone display cannot be read by most laser scanners. An alphanumeric coupon code may be useful for online purchases, but is simply not practical for most retail POS systems. Although there may be special exceptions, conventional POS systems are simply not configured to communicate (e.g., wirelessly) with cell phones or receive coupon data communicated from cell phones (e.g., via SMS, email, or otherwise). Thus, applications that contemplate Bluetooth, Wi-Fi or SMS communication of coupon data to a handheld electronic device are impractical, or of extremely limited utility, today.

Another shortcoming of conventional coupons is security. According to an article entitled "Coupon Fraud Grows" in the Mar. 4, 2010 edition of the *Wall Street Journal*, the use of counterfeit coupons for groceries and other items has risen as budget-conscious consumers increasingly get their coupons from online sources. Today it is easy to craft coupons with barcodes that appear legitimate to check-out clerks and can be scanned at the POS. To combat such fraud, sophisticated wholesalers have begun including watermarks and holograms on their legitimate coupons, making the fraudulent coupons easy for them to spot. However, many wholesalers and printed media are not equipped to implement such protections. Additionally, check-out clerks are not trained to distinguish a real from a fake coupon for every possible brand.

What is needed is a practical device for interfacing with an electronic device to receive electronically stored barcode data from the electronic device. What is also needed is a practical device for communicating electronically stored barcode data to conventional barcode readers. What is also needed is a cost effective alternative to conventional printed coupons, something that is compatible with the ubiquitous laser barcode scanners of conventional POS systems. Preferably, the alternative enables on-demand electronic retrieval of coupons for use at a conventional POS.

The invention is directed to overcoming one or more of the problems and solving one or more of the needs as set forth above.

SUMMARY OF THE INVENTION

To solve one or more of the problems set forth above, in an exemplary implementation of the invention, a barcode data management system that includes a synthetic barcode module is provided. An exemplary programmable synthetic barcode module comprises an audio input, light management components and a controller. The audio input receives audio output from an electronic device. The audio output is modulated in such a way as to correspond to barcode data using a digital to audio modulation scheme. The light management component emits light pulses that emulate light reflected from a scanned barcode. The light management components include an LED operating as both an optical receiver and an optical emitter. The LED receives light pulses and emits light pulses. The controller interfaces with a compatible electronic device via the audio input, receives an audio signal stream corresponding to one or more barcodes. The controller determines if light pulses received via the LED correspond to scanner output. The controller also generates signals that cause the light management components to emit, via the LED. The generated signals are driver signals that cause the light management module to emit the light pulses that emulate light reflected from a scanned barcode to communicate the barcode optically. The controller determines if the received light pulses correspond to barcode scanner by checking stimulus timing (e.g., by determining if the timing of received light pulses corresponds to light pulses emitted from a barcode scanner). A signal conditioning circuit operably coupled to the LED and the controller improves a signal to noise ratio and supplies a logic level signal to the controller module corresponding to light received by the LED. The light management module includes an LED driver configured to regulate electrical power supplied to the LED.

In one embodiment, the synthetic barcode module is a key part of a system that also includes a cell phone or other electronic device with computing and wireless communication capability (or any other portable electronic computing device with wireless communication capability and a port for connecting and an interface for operably coupling the synthetic barcode module) and a remote computer system. The synthetic barcode module can be interfaced with the cell phone via an audio jack. As used herein a cell phone, cellular phone or mobile phone refers to an electronic device used for full duplex two-way radio telecommunications over a cellular network of base stations. In addition to being a telephone, a cell phone as contemplated herein supports additional functions and services. A cell phone is merely one type of mobile computing device with which the invention may be used.

The cell phone receives and stores barcode data, such coupon data, from the computer system. Optionally, an application referred to as a coupon management application is executable on the cell phone and enables management of the received and stored coupon data and interfacing to one or more services that supply coupon data to the cell phone. Though such an application may be advantageous, it is not required on any device able to download, select and play audio files. Any such device is capable of managing audio files for coupons according to the invention. The cell phone supplies the received coupon data to the synthetic barcode module. The coupon data includes barcode data for generating a synthetic barcode. The synthetic barcode module discriminates light pulses received from a barcode scanner from light received from other sources such as ambient light sources. When the synthetic barcode module detects a scanner, it emits light pulses that simulate light reflected from a barcode corresponding to the coupon data received from the cell phone. The scanner interprets the light pulses as light reflected from a barcode corresponding to the coupon.

A coupon management method according to principles of the invention includes steps of providing a synthetic barcode module; receiving, on a cell phone, coupon data from a coupon data source, which may be a remote computer system configured to deliver coupon data; interfacing the synthetic barcode module to the cell phone; using the synthetic barcode module, receiving light emitted from a laser barcode scanner; generating a signal from the light received from the external light source using the LED; conditioning the signal from the light received from the external light source to improve signal to noise ratio; determining if the signal corresponds to light received from a barcode scanner; and, if the signal corresponds to light received from a barcode scanner, then generating optical output using the synthetic barcode module, said optical output corresponding top coupon data and simulating light reflected from a barcode for the coupon data.

An exemplary synthetic barcode module according to principles of the invention includes a light management module that produces output signals corresponding to received light pulses, emits light pulses that emulate light reflected from a scanned barcode in scan mode, and emits light pulses that enable optical bidirectional communication in programming mode. The light management module includes an LED operating as both an optical receiver and an optical emitter. The LED receives light pulses, produces output signals corresponding to the received light pulses, and emits light pulses. A controller module receives and stores at least one code corresponding to at least one coupon data field, receives output signals corresponding to received light pulses, determines if the received light pulses correspond to a barcode scanner, and outputs driver signals to cause the light management module to emit light pulses that emulate light reflected from a scanned barcode to communicate the at least one coupon code optically to the barcode scanner. An audio interface (e.g. audio jack) communicatively couples the module to a mobile computing device such as a cell phone. The synthetic barcode module may be removably attachable to or integrated with the mobile computing device. The controller module determines if the received light pulses correspond to a barcode scanner by checking stimulus timing and determining if the timing of received light pulses corresponds to a barcode scanner. The coupon code corresponds to a barcode of a coupon. A housing contains the controller module.

The exemplary synthetic barcode module also includes analog signal receiving and processing components, such as an FSK receiver and UART, to convert received analog input into digital data that can be used by the microcontroller.

The coupon synthetic barcode module may have several optional features. In a removable embodiment, the module (e.g., the housing of the module) may include a keychain ring. The coupon synthetic barcode module may include its own battery power supply.

In another embodiment, the mobile computing device is a cellular telephone (such as a smart phone) configured to receive coupon codes in the form of audio files from a remote source via wireless cellular communication. A client application executable on the mobile computing device manages user selection and use of each coupon code, controls transmission of each coupon code from the mobile computing device to the coupon synthetic barcode module via the audio interface by playing the audio files. A plurality of coupon codes may be stored in a queue on the mobile computing device, with the client application providing a function for a user to control sending a next coupon code in the queue from the cellular telephone to the module. Alternatively, the client application working with a microphone in the mobile computing device may detect an audible signal corresponding to a successful scan. Upon such detection, the next coupon code in the queue would be sent. The client application also provides a search tool configured to search for available coupon codes from one or more remote source.

In another exemplary embodiment, no intelligent host is needed. The synthetic barcode module could be programmed with new coupon codes through an audio output jack from any device that reproduces (i.e., plays) sound. Such devices may include TV and radio receivers. In this instance, an advertiser would instruct the user to plug their unit into the earphone jack, or to place the device's microphone in close proximity to the speaker, to have their module programmed with the advertised coupon code(s). Coupon codes could also be distributed on iTunes or any internet service that enables someone to download audio files.

BRIEF DESCRIPTION OF THE DRAWINGS

The foregoing and other aspects, objects, features and advantages of the invention will become better understood with reference to the following description, appended claims, and accompanying drawings, where:

Figure 1:
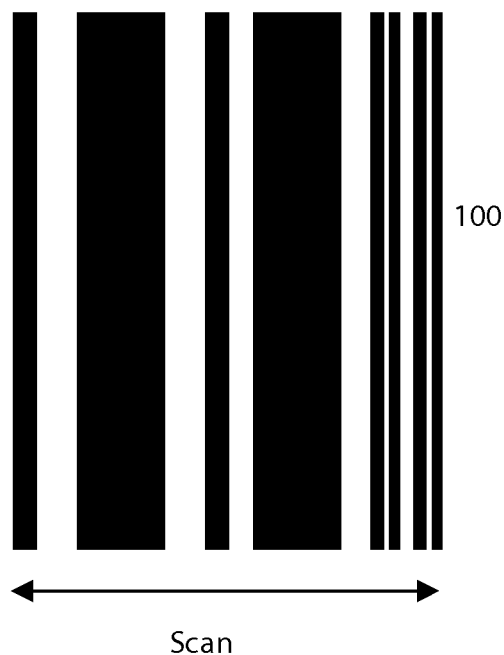
FIGS. 1 provides a schematic diagram that conceptually illustrates principles of an exemplary synthetic barcode process according to principles of the invention.

Those skilled in the art will appreciate that the figures illustrate one or more exemplary embodiments and are not intended to be drawn to any particular scale; nor are the figures intended to illustrate every embodiment of the invention. Flowcharts illustrate exemplary processes, which may include fewer, additional or different steps, and in different orders, and yet remain within the scope of the invention. Block diagrams illustrate exemplary systems, which may include fewer, additional or different components, and in different configurations, and yet remain within the scope of the invention. Thus, the invention is not limited to the exemplary embodiments depicted in the figures or the particular circuitry, components, applications, or ornamental aspects, steps, configurations or arrangements shown in the figures.

DETAILED DESCRIPTION

A synthetic barcode module, system and method that utilize a compact, reliable, adaptable, and cost effective audio-optical electronic synthetic barcode device, which obviates printed barcodes, is provided. The device is capable of detecting the presence of a conventional laser barcode scanner and capable of communicating barcode information, such as coupon information, in a form readable by a detected conventional laser barcode scanner. Barcode information is communicated to the device as audio output from an electronic device equipped with an audio output jack. The system is compatible with network communication, allowing real-time monitoring and updating.

As used herein a coupon broadly denotes any medium that includes scannable information that is relevant to a transaction. The scannable information is information that is readable by a barcode scanner. By way of example and not limitation, a coupon may comprise a ticket, document or voucher that can be exchanged for a financial discount, credit, rebate, rewards, points or other consideration when purchasing a product or service. Customarily, coupons may be issued by manufacturers, wholesalers, distributers or retailers, to be used in retail stores or other establishments as a part of sales promotions. Another type of coupon within the scope of the invention is a welfare coupon, intended to help low income individuals satisfy their nourishment needs. Yet another type of coupon is a preferred customer card, which entitles the registered holder to financial discounts, credits, rebates, rewards, points or other benefits for purchases.

A key component of the system is a synthetic barcode module configured to detect the presence of a barcode scanner and respond by emitting light that emulates light reflected from a scanned barcode associated with a coupon. Uniquely, an exemplary module employs a single LED as a photodiode to sense the presence of a barcode scanner and as a light source to emit light that emulates light reflected from a scanned barcode. The LED enables bidirectional half-duplex optical communication. The module may be configured to interface with and be controlled by a mobile computing device such as a cellular phone. Also uniquely, the exemplary module receives input in the form of analog audio output signals from the audio output jack of an electronic device.

For example, a module according to principles of the invention may be removably attached to a cellular telephone. A cell phone is merely one type of mobile computing device with which the invention may be used. By way of example and not limitation, a cell phone as contemplated herein is configured to store and process coupon data and communicate data signals to a coupon synthetic barcode module as described herein. Components of an exemplary cell phone with which the invention may be used include a rechargeable battery and power management circuit providing a power source and power management functions; an input mechanism and display to allow the user to interact with the phone such as a keypad or touch screen; memory for data storage such as novolatile RAM; a processor comprising a central processing unit to handle various commands and functions and data processing; analog-to-digital and digital-to-analog converters to translate the outgoing audio signal from analog to digital and the incoming signal from digital back to analog; and a radio frequency (RF) transciever to amplify, encode, decode, receive and transmit RF signals.

Alternatively, a module according to principles of the invention may be an integral part of a mobile computing device such as a cellular telephone. In such an embodiment, the module is still configured to interface with and be controlled by the mobile computing device.

The cell phone may receive and store data in the form of audio files corresponding to coupons. As used herein, an audio file broadly refers to any file or data stream for storing or communicating digital audio data on a computer system. This data can be stored uncompressed, or compressed to reduce the file size. It can be a raw bitstream, but it may be in a container format or an audio data format with a defined storage layer. By way of example and not limitation, uncompressed audio data may be stored using pulse code modulation (PCM), such as in a .wav file on Windows or in a .aiff file on Mac OS. The AIFF format is based on the Interchange File Format (IFF). The WAV format is based on the Resource Interchange File Format (RIFF), which is similar to IFF. WAV and AIFF are flexible file formats designed to store more or less any combination of sampling rates or bitrates.

In a preferred embodiment, the audio file encodes a series of tones. When played using a media player application, the audio file causes the device (e.g., cell phone) to generate the series of tones. Each tone may be at one of two frequencies, representing either a digital zero or a digital one. By way of example and not limitation, a digital zero may be represented by a 1200 Hz tone, while a digital one may be represented by a 2200 Hz tone. A numerical designation for a barcode may be represented in binary notation, using digital ones and zeros. Start bits and stop bits may also be represented using digital ones and zeros. When the audio file is played by a media player, analog audio signals corresponding to the series of tones, which represent a barcode, and any additional data such as start and stop bits, are emitted through the audio output jack. As described in more detail below, the synthetic barcode module receives and converts the analog signals back into a serial bit stream comprised of digital ones and zeros.

When prompted by a user, a client application executed on the cellular telephone plays an audio file that corresponds to a coupon. The analog audio output emitted from the audio jack of the cell phone comprises analog signals corresponding to stored data for the coupon. The module receives these signals via an audio plug mated with the audio jack. The signals may be decoded by the module into optical driver signals. When the module detects light emitted from a laser barcode scanner, the module responds optically by emitting light pulses. Light emitted from the module corresponds to a barcode, such as a coupon barcode. The barcode scanner interprets the emitted pulses of light as light reflected from a barcode, such as the barcode for a corresponding coupon. If there are several barcodes, the user may instruct the cellular telephone to play a series of audio files until each barcode has been played and used. Alternatively, the phone may be configured to automatically play the next audio file corresponding to the next coupon according to a time schedule or based upon detection (e.g., audible detection) of a positive scan. Thus, the invention provides an easy-to-use paperless wireless barcode on demand system that works with conventional laser barcode scanners.

Referring now to the Figures, in which like parts are indicated with the same reference numerals, various views of an exemplary compact, reliable, adaptable and inexpensive system and method for communicating coupon barcode data in a form readable by a conventional laser barcode scanner are conceptually shown. For convenience of reference, an electronic assembly that detects the presence of a laser barcode scanner using a sensor and, using either that same sensor or an LED separate from the sensor, emits light pulses that emulate light reflected from a determined barcode in accordance with principles of the invention is referred to herein as a synthetic barcode module.

Advantageously, a synthetic barcode module according to principles of the invention may supply an optical signal to a conventional barcode scanner, such as laser scanners in widespread use in retail and industrial establishments. The optical signal emulates light reflected from a determined barcode, such that the decoded output from the scanner is equivalent to the decoded output that would be produced by scanning the emulated printed barcode. Consequently, standard inventory universal product code (UPC) scanning technology may be employed without an actual barcode being displayed. Many conventional point of sale systems will require no modification or enhancement to accommodate a synthetic barcode module according to principles of the invention.

In an exemplary embodiment, the synthetic barcode module is configured to emit light pulses that emulate light reflected to a barcode scanner from a scanned printed barcode, which may be any type of barcode, such as, for example, UPC, SKU, EAN, Interleaved 2 of 5, Code 93, Code 128, Code 39, or any other standardized or specially designed type of barcode or barcode symbology comprising parallel lines. A typical barcode scanner uses a scanning beam, typically narrow band light in the visible spectrum such as red laser, but potentially any bandwidth of light in the visible or infrared spectra, to pass over a sequence of nonreflecting and reflecting bars, such as dark (e.g., black) bars and light (e.g., white) spaces comprising a conventional barcode. However, the invention is not limited to use with conventional black and white visible barcodes. Instead, any alternating photon reflecting and photon absorbing materials may be utilized to provide the desired light absorption and reflecting effect. Pigments tend to appear as the colors they are because they selectively reflect and absorb certain wavelengths of visible light. Certain pigments selected to reflect the color of light emitted by the light source may be utilized for the reflecting regions, while pigments selected to absorb the color of light emitted by the light source may be utilized for the reflecting regions. A pigment that reflects across the entire visible wavelength range (i.e., about 380-770 nanometers) appears as white. Black surfaces absorb these wavelengths. If some regions of this light are absorbed and others reflected, then the object is colored. For example, an object that absorbs all visible light except the region 400-450 nm appears blue, while another that reflects only 650-700 nm light has a red color. As further examples, chlorophyll pigments absorb blue and red light but transmit green accounting for the color of leaves. Carotenoid pigments absorb violet and blue but transmit yellow, orange, and red, accounting for the bright orange color of carrots and apricots, which are rich in carotene.

Figure 2:
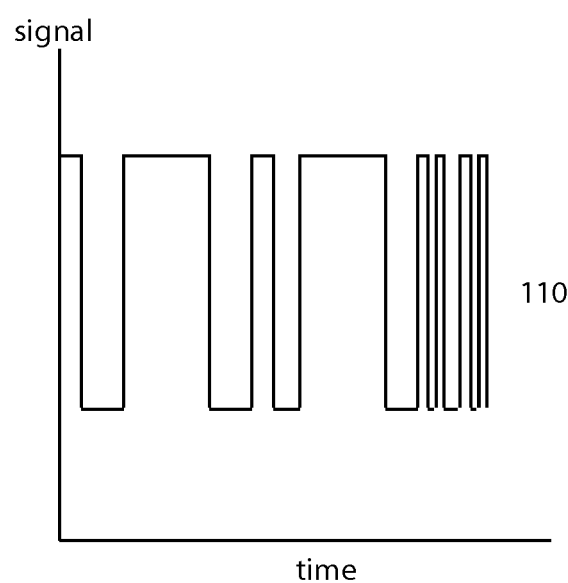
FIGS. 2 provides a schematic diagram that conceptually illustrates principles of an exemplary synthetic barcode process according to principles of the invention.

Scanning may progress sequentially left to right and/or right to left. As the beam of light scans across a barcode, such as the barcode 100 shown in FIG. 1, the beam is at least partially reflected back to the scanner by the spaces and at least partially absorbed by the bars. A receiver, such as a photocell detector, in the barcode scanner receives the reflected beam and converts it into an electrical signal. As the beam scans across the barcode, the scanner typically creates one electrical signal for the spaces where the beam is reflected, and a different electrical signal for the bars where the beam is absorbed. This process is conceptually illustrated by the signal stream 110 in FIG. 2. The scanning speed and the width of each space and bar determine the duration of each electrical signal. The signals (including its duration) are decoded by the scanner or by an external processor into characters that the barcode represents.

Figure 3:
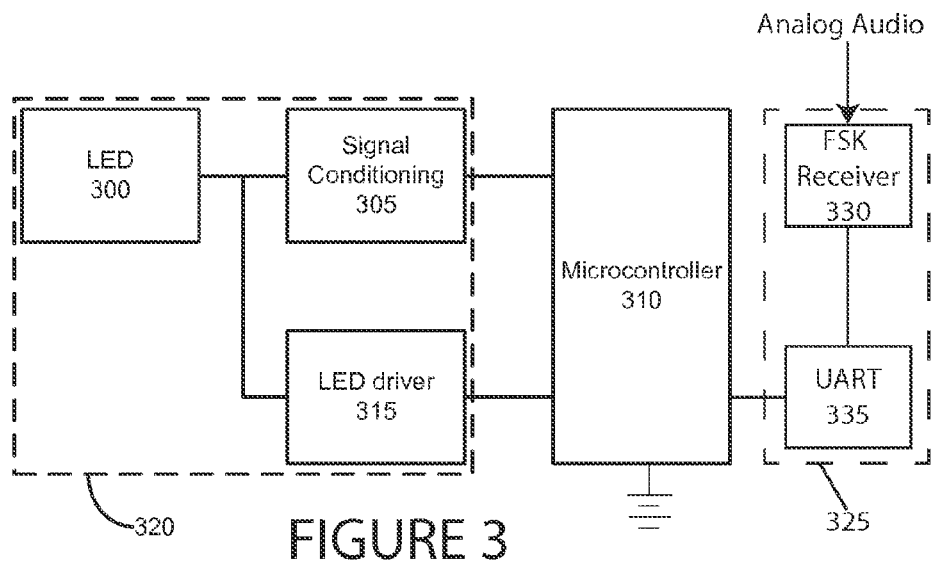
FIG. 3 provides a high level block diagram of components of an exemplary embodiment of a synthetic barcode module assembly according to principles of the invention.

As conceptually illustrated in FIG. 3, a first embodiment of an exemplary synthetic barcode module comprises an assembly that is intended to be the target of the standard point of sale barcode scanners, such as those used at checkout lanes. An LED 300 serves as both an optical sensor (i.e., photodiode) and light source. The LED 300 may be very small. The LED 300 will generate an electrical signal upon exposure to the direct laser scanning beam. In a preferred embodiment, the LED is configured to operate in "short circuit mode" and generate a current (e.g., a current measured in µA) in response to incident light. While an LED is generally not an efficient photocell, in the presence of a laser scanner an LED will produce a sensible signal, e.g., enough microamps at enough volts to operate an amplifier or logic gate. As a photodiode, the LED is sensitive to wavelengths equal to or shorter than the predominant wavelength it emits. An HeNe laser found in older laser barcode scanners and a laser diode used in modern barcode scanners have an operation wavelength ($\lambda$) of about 630 to 650 nm, in the red portion of the visible spectrum. Thus, for example, a Super High Brightness Red LED, which emits pure red to He-Ne laser red light, with a peak wavelength ($\lambda$) between 650 and 670 nm, will be sensitive to red light from a laser barcode scanner. Similarly, an infrared LED may be used to sense light emitted from and emulate light reflected to an IR barcode scanner. The LED can be multiplexed, such that it can be used for both light emission and sensing at different times. As both an emitter and detector of light, the single LED can be used to achieve bidirectional communications with another device. Operating as a half-duplex transceiver, the LED enables optical programming of a module according to principles of the invention. Although one LED 300 is shown in FIG. 3, those skilled in the art will appreciate that in certain embodiments a plurality of LEDs 300 may be utilized, at least one of which serves as both a light emitter and a sensor, within the scope of the invention.

A signal conditioning circuit or device 305 (i.e., "signal conditioner") improves the signal to noise ratio from the LED 300 and supplies logic level signals to a microcontroller 310 when a scanning laser is observed by the LED 300. The signal conditioning circuitry is configured to receive input from the LED and detect (e.g., filter) a weak signal (e.g., a few microamps) generated by the LED 300, discriminate the laser pulse form from that of other light sources (e.g., due to voltage rise time), and then adjust the signal voltage to the input level required by the microcontroller 310. Signal conditioning entails processing input analog signals from the LED 300 and generating output signals (e.g., digital logic level signals) to meet the requirements of the microcontroller 310 for further processing. The signal conditioning may include amplification, filtering, converting, range matching, isolation and any other processes required to make output from the LED 300 suitable for processing by the microcontroller 310 after conditioning. Filtering separates noise from the portion of the signal frequency spectrum that contains valid data. Amplification increases the resolution of the inputted signal, and increases its signal-to-noise ratio. Optionally, signal isolation may be used to isolate possible sources of signal perturbations and protect the microcontroller. The signal conditioning circuit may also include an analog-to-digital converter (ADC) configured to convert the input analog current to digital logic level signals representative of the magnitude of the input current. The signal conditioning circuit 305 has a high enough input impedance that it is not affected by the drive voltage delivered to the LED 300 by the LED driver 315.

In an exemplary embodiment, the signal conditioning circuit 305 uses amplification and a high pass filter to discriminate a laser pulse form from that of other light sources based upon signal amplitude and rise time. Illustratively, the signal conditioning circuit 305 may be configured to handle as a laser pulse any signal with an amplitude and rise time of about $(0.1 \text{ mW/mm}^2)/100$ µs, or a greater amplitude or a quicker rise time. Skilled artisans will appreciate that for a given LED, tests may be performed using a variety of ambient and laser light sources to determine a workable amplitude and rise time for discriminating a laser pulse form from that of other light sources.

The microcontroller 310 is a programmable integrated circuit comprised of a CPU with support features, such as an oscillator, timer, watchdog, and serial and analog I/O. Program memory, such as memory in the form of flash or ROM is included as well as a some RAM. The microcontroller 310 is configured to respond to signals from the signal conditioning circuit 305. The microcontroller 310 receives conditioned signals via the signal conditioning circuit 305. The microcontroller 310 may include an analog to digital converter (ADC) to convert input analog voltage (or current) continuous signals to discrete digital data. The microcontroller 310 may also include a digital-to-analog converter (DAC) to perform the reverse operation for output signals. The microcontroller 310 is programmed to cause the LED driver to energize the LED and transmit light pulses in a fashion to simulate the reflections from printed barcodes using the EAN-13, UPC-A, or other standard barcode systems, so that the emitted pulses can be read using a conventional barcode reader. The microcontroller 310 may be comprised of any suitable controlling device, such as a logic circuit, a microprocessor, a combination of these elements, and the like.

The microcontroller 310 may have an internal clock oscillator as the time base for all operations. Alternatively, a crystal and associated circuitry may be utilized for a timing base. It may also have internal memory, which may store programming for the module and a table that determines the time and duration the LED 300 must be illuminated in order to generate light pulses comprising the synthetic barcode signal. Timing data for barcode synthesis may reside in the microcontroller 310 from manufacture or may be downloaded at some later point through any type of communications medium, e.g. RS232, RF data link, optical data link, etc.

The microcontroller 310 sends control signals to the LED driver 315 to make the LED 300 turn on and off with sufficient brightness, and at the correct timing, for the emitted light to be interpreted by a standard laser barcode scanner as the signal from a printed barcode. By way of example and not limitation, the microcontroller 310 may modulate the light emission period by sending control signals to the LED driver 315.

In an exemplary embodiment, the microcontroller 310 causes the LED driver 315 to cause the LED 300 to emit light and cease emission for determined periods of time, according to a determined symbology. The specification of a symbology includes the encoding of the single digits/characters of the message as well as the start and stop markers into bars and space, the size of the quiet zone required to be before and after the barcode as well as the computation of a checksum. Illustratively, x millisecond periods (representing white spaces between bars) during which light is emitted and y millisecond periods (representing black bars) during which no light is emitted may be utilized to emulate light reflected from a barcode. The variable x may vary from a few milliseconds (e.g., 2 or 4 milliseconds) to multiples of that amount (e.g., 1, 2, 3 or 4 times that amount), depending upon the width of the space represented. Likewise, y may vary from a few milliseconds (e.g., 2 or 4 milliseconds) to multiples of that amount (e.g., 1, 2, 3 or 4) times that amount, depending upon the width of the bar represented. The timing works well across a wide range of barcode scanners. The barcode scanner interprets the emitted light as an analog signal waveform of more or less rectangular-shaped pulses.

The LED 300 is a current-driven device whose brightness is proportional to its forward current. Forward current can be controlled either by applying a voltage source and using a ballast resistor or, preferably, by regulating LED current with a constant-current source, such as an LED driver 315. The LED driver 315 supplies a correct amount of current to drive the LED 300. While a separate LED driver 315 is shown, the LED driver 315 could optionally be included or integrated into the microcontroller 310. The LED driver 315 eliminates changes in current due to variations in forward voltage, which translates into a constant LED brightness. Optionally, the LED driver 315 may enable Pulse Wave Modulation (PWM) dimming, which entails applying full current to the LED at a reduced duty cycle and at a high enough frequency (e.g., >100 Hz) to avoid pulsing that is visible to the human eye. In some embodiments, the LED driver 315 may be comprised of one or more pins on the microcontroller 310 with a current limiting resistor. A switched current source or current sink may also be used to drive the LED 300.

The audio interface 325 is an analog audio plug 510 that mates with the receptacle 705 of an analog audio jack of an electronic device by plugging into the device. By way of example and not limitation, a two contact TS connector (tip, sleeve), a three contact TRS connector (tip, ring, sleeve) or a four contact TRRS connector, also called an audio jack, stereo plug, mini-jack, or headphone jack may be used. A three- or four-conductor 2.5 mm analog audio jack is widely used on cell phones, providing mono (three conductor) or stereo (four conductor) sound and a microphone input.

The audio interface 325 receives and demodulates the analog audio signals, producing digital output that can be processed by the microcontroller. In a particular preferred embodiment, the audio interface includes a frequency shift keying (FSK) receiver 330 (or transceiver), which is signal processing circuitry that receives the analog audio input and generates binary data output. The binary data comprises the zeros and ones modulated in the analog audio signal. This data stream may include error detection and/or correction codes. The FSK receiver 330 may comprise discrete circuitry, an integrated circuit and/or an integral functional component of the microcontroller 310.

In a particular preferred embodiment, the audio interface 325 also includes a universal asynchronous receiver (UART) 335. The UART 335 receives demodulated binary serial digital data (i.e., the ones and zeros) from the FSK receiver 330 and converts the serial data into parallel data words that can be utilized by the microcontroller 310. Output of the UART 335 is supplied to the microcontroller. A conventional UART design, including known variable baud rate designs can be used to implement UART 335. The UART 335 may comprise discrete circuitry, an integrated circuit and/or an integral functional component of the microcontroller 310.

A synthetic barcode module according to the invention includes an audio interface 325 that interfaces the microcontroller 310 with the analog output conductors of the audio jack. An exemplary synthetic barcode module according to the invention does not require the microphone input. If an audio jack includes a microphone input, the module may not use it. Alternatively, the module may contain a microphone coupled to the microphone input, for example, if the electronic device and/or module will respond to external audio (e.g., speech or audio output from a barcode scanner). The microcontroller 310 includes, either as an integral component or as a peripheral component, an A/D converter that converts the analog audio to digital data corresponding to a barcode (i.e., barcode data).

In operation when a laser barcode scanner hits the LED 300, the signal conditioning circuit 305 communicates filtered and amplified signals to the microcontroller 310, which causes the LED driver 315 to drive the LED 300 in a manner that emits a predefined series of light flashes corresponding to light reflected to a scanner upon scanning a barcode. When that series of light flashes has been sent, the system module waits for another hit from a scanning laser beam to repeat the process. The timing of the transmitted light pulses may be preprogrammed in the microcontroller 310.

The synthetic barcode module sequentially communicates barcode data via a communication path (e.g., optical communication path). Thus, barcode data corresponding to coupons may be communicated via an optical communication path using the synthetic barcode module.

Figure 4:
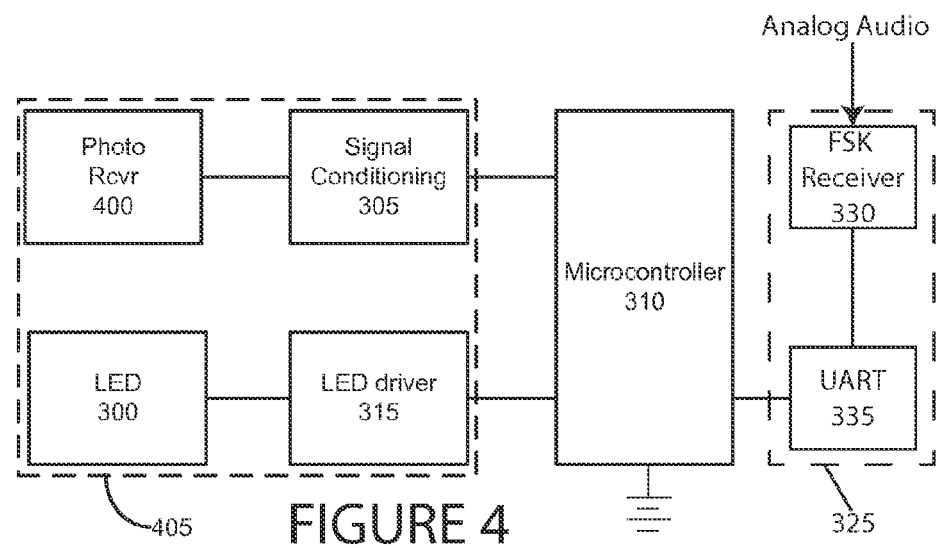
FIG. 4 provides a high level block diagram of components of another exemplary embodiment of a synthetic barcode module assembly according to principles of the invention.

Although one dual function LED 300 is shown in FIG. 3, those skilled in the art will appreciate that a plurality of LEDs 300 may be utilized, at least one of which is configured to serve as a sensor. Alternatively, as shown in FIG. 4, a separate photo receiver 400 may be utilized. The photo receiver 400 may be comprised of any compatible photo detector capable of sensing electromagnetic energy in the visible and/or infrared parts of the spectrum, as emitted by a barcode scanner. Nonlimiting examples of suitable photo receivers include photoresistors which change resistance according to light intensity, photovoltaic cells which produce a voltage and supply an electric current when illuminated, photodiodes which can operate in photovoltaic mode or photoconductive mode converting light into either current or voltage, and phototransistors incorporating one of the above sensing methods. The photo receiver 400, which is dedicated to sensing light emitted from a barcode scanner, may be responsive to wide range of wavelengths of light. Illustratively, photodiodes are available for visible through infrared wavelengths. A silicon photodiode may provide a spectral response from wavelengths of 190 to 1100 nm, while a germanium photodiode may offer a spectral response from 400 to 1700 nm and an Indium gallium arsenide photodiode may provide a spectral response from about 800 to 2600 nm.

Each embodiment shown in FIGS. 3 and 4 includes a synthetic barcode circuit 320, 405 operably coupled to a microcontroller 310. The LED 300 of the synthetic barcode circuit 320 of the embodiment shown in FIG. 3 is operably coupled to both the signal conditioning circuit 305 and LED driver 315. In that embodiment, the LED 300 functions as both an emitter and a photodiode. The synthetic barcode circuit 405 of the embodiment shown in FIG. 4 includes the LED 300 operably coupled to the LED driver 315 and a photo receiver 400 operably coupled to the signal conditioning circuit 305. In that embodiment, the LED 300 functions only as an emitter and the photo receiver 400 functions as an optical-to-electrical transducer. Thus, the difference between the two embodiments is that the photo receiver 400 is configured to sense optical input in the synthetic barcode circuit 405 of the embodiment shown in FIG. 4, while the LED 300 performs both sensing and emission in the synthetic barcode circuit 320 of the embodiment shown in FIG. 3.

Figure 5:
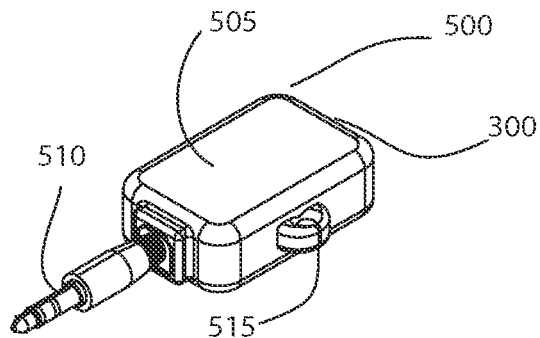
FIG. 5 provides a perspective view that conceptually illustrates an exemplary synthetic barcode module according to principles of the invention.
Figure 6:
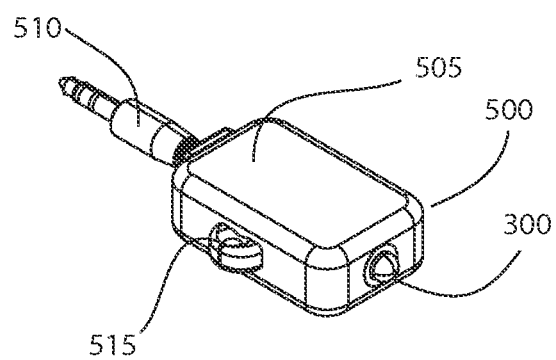
FIG. 6 provides another perspective view that conceptually illustrates the exemplary synthetic barcode module according to principles of the invention.

Referring now to FIGS. 5 and 6, an embodiment of an exemplary synthetic barcode module 500 is conceptually illustrated. The module 500 includes a housing 505 that contains the electronic and optical components, such as the components described above with reference to FIGS. 3 and 4. The housing not only encloses electronic and optical components to protect them from physical forces and the environment, but also serves an aesthetic function being pleasing to the eye. The housing also provides a framework to mount components such as an LED 300, a connector 510 and a keychain ring 515.

Optionally, the module 500 may contain a battery as a power supply. Alternatively, the module may receive power through a power and data port of a cellular phone or other electronic appliance. If the module 500 includes a microphone jack that accepts an external microphone, such as a condenser microphone, a small amount of power may be supplied to the microphone jack.

Advantageously, the embodiments illustrated in FIGS. 3, 4 and 5 can be extremely compact, built only slightly larger than an LED and RFID circuit with the use of die components and a small battery. As another advantage, these embodiments would consume very little battery energy until interrogated by a laser scanner or RFID reader. With a low duty cycle, a good battery could be expected to last a considerable time (e.g., possibly years).

The connector 510 provides an analog signal coupling with a compatible electronic device such as a cellular phone. By way of example and not limitation, connector 510, which comprises the audio interface 325, is an analog audio plug that mates with the receptacle of an analog audio jack of an electronic device by plugging into the device. A two contact TS connector (tip, sleeve), a three contact TRS connector (tip, ring, sleeve) or a four contact TRRS connector, also called an audio jack, stereo plug, mini-jack, or headphone jack may be used. A three- or four-conductor 2.5 mm analog audio jack is widely used on cell phones, providing mono (three conductor) or stereo (four conductor) sound and a microphone input.

Optionally, a keychain ring 515 is provided. The keychain ring enables attachment to a keychain. A user may attach the module 500 to keychain to ensure that the device is readily available at checkout lanes.

Figure 8:
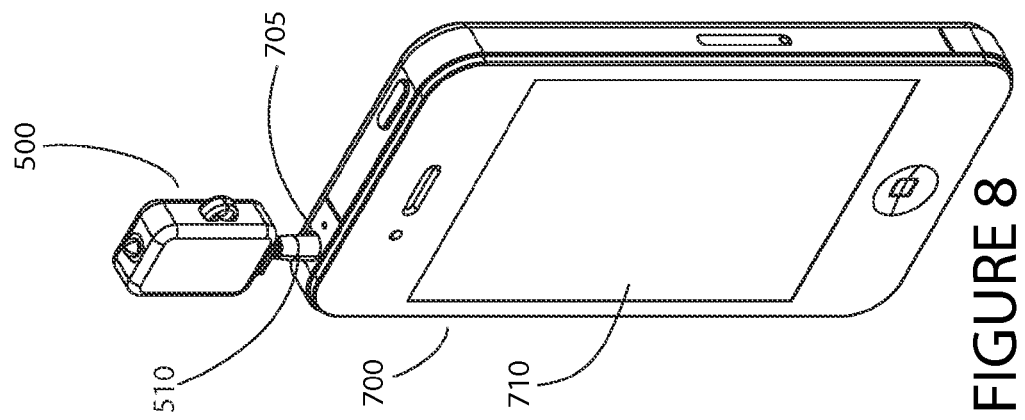
FIG. 8 provides a perspective view that conceptually illustrates a cellular phone equipped with an exemplary synthetic barcode module according to principles of the invention.
Figure 7:
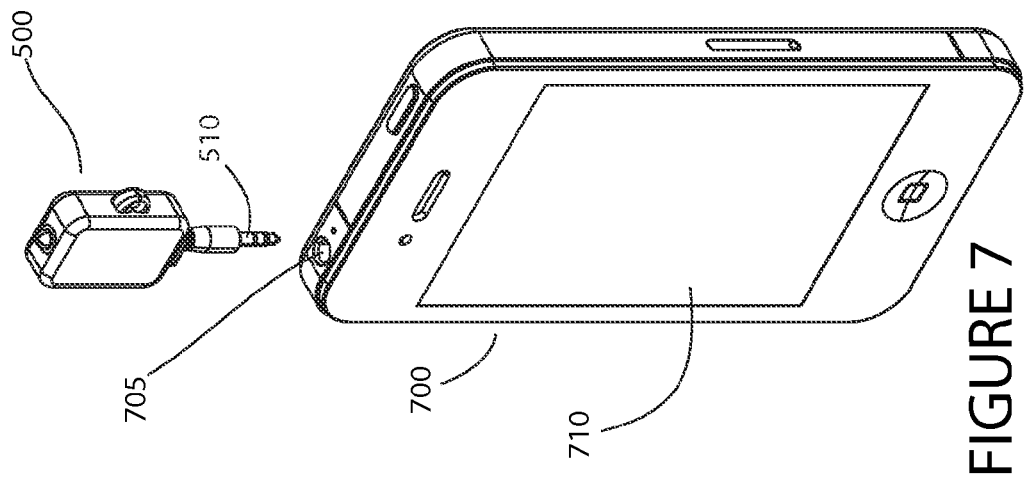
FIG. 7 provides a plan view that conceptually illustrates a cellular phone equipped with an exemplary synthetic barcode module according to principles of the invention.

Referring now to FIGS. 7 and 8, the module 500 is illustrated connected to a cellular phone 700. The phone 700 includes a display 710, which may be a touch panel display. Alternatively, a user interface such as a keypad or touchpad may be provided for manual input. Additionally, a microphone may be provided for audible input. A jack 705, such as a surface mounted analog audio jack, receives the connector 510 of the module 500. Thus, the cellular phone 700 may analog signals to the module 500.

Figure 9:
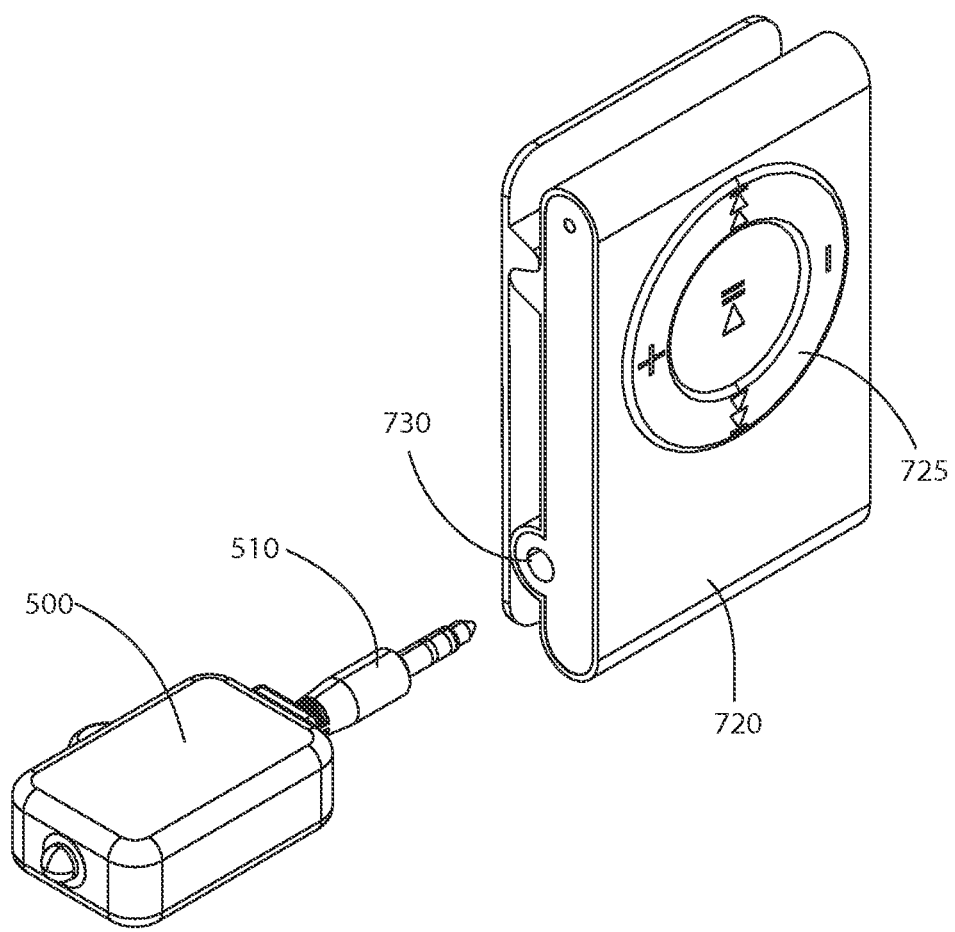
FIG. 9 provides a perspective view that conceptually illustrates a portable music player equipped with an exemplary synthetic barcode module according to principles of the invention.

FIG. 9 provides a perspective view that conceptually illustrates a portable music player 720 equipped with an exemplary synthetic barcode 500 module according to principles of the invention. A jack 730, such as a surface mounted analog audio jack, receives the connector (i.e., male plug) 510 of the module 500. User controls 725 allow a user to select an audio file to play. In this embodiment, coupon codes may be distributed on iTunes or any audio file delivery service.

Figure 10:
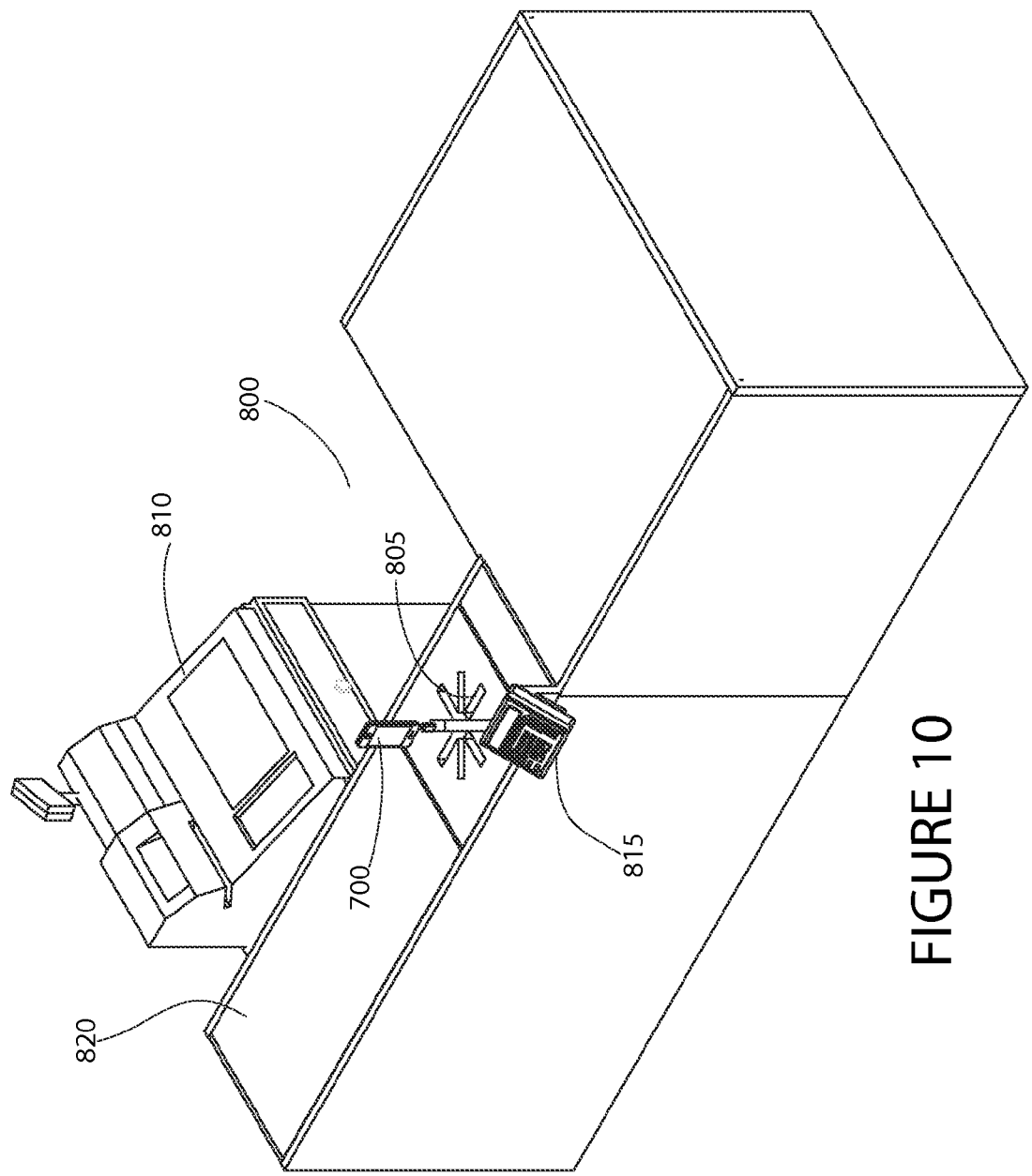
FIG. 10 provides a perspective view that conceptually illustrates a cellular phone equipped with an exemplary synthetic barcode module being used with a conventional laser barcode scanner at a typical checkout lane according to principles of the invention.

FIG. 10 conceptually illustrates use of the module 500 at an exemplary checkout lane 800. The checkout lane includes a register 810, conveyor 820, electronic payment processing device 815 and a scanner 805. The scanner 805 is a conventional fixed laser barcode scanner commonly used at grocery checkout lanes. However, the invention is not limited to such scanners. Rather the invention works with other scanners that respond to light reflected from a barcode, such as handheld scanner guns and the like.

The phone 700 stores data corresponding to coupons. The coupon data may be uploaded to the phone 700 wirelessly on demand from any remote source. Alternatively, the coupon data may be uploaded to the phone from a paired personal computer during synchronization. The manner in which the coupon data is provided to the phone 700 is not particularly important. Any method of supplying data in the form of analog signals from an electronic device, such as the cell phone 700, to the module 500 may be utilized.

A client application executable on the phone 700 facilitates storage, selection and transmission of coupon data. As discussed above, the client application may take the form of a media player, particularly an audio player, which is a software application for playing the audio files. In a particular preferred embodiment, the application includes a media library containing image files (e.g., thumbnails) and data corresponding to each audio file. The media player application displays information (e.g., thumbnails and text) associated with each audio file in a media library. The application may allow a user to organize and sort the audio files, such as by product category, expiration and amount. In a coupon embodiment, where the audio files correspond to coupons, then during checkout, a consumer using the application may review the stored coupon data and select coupons corresponding to purchased items. The selection may be made using the phone's 700 user interface 715.

At the appropriate time in the checkout process, the consumer may instruct phone 700 to cause the module 500 to emit synthetic barcodes corresponding to the selected coupons. In response, the phone 700 transmits analog signals to the module 500 by playing audio files corresponding to the barcodes. The signals are transmitted from the phone's jack 705 through the module's connector 510 into the module's circuitry (e.g. the circuitry corresponding to the schematic of FIG. 3). The instruction may be made using the phone's 700 user interface 715. The signals are received by the module 500.

When the module 500 detects light emitted from the laser barcode scanner 805 using the LED 300, the module 500 responds optically by emitting light pulses from the LED 300. Light emitted from the module 500 corresponds to a coupon barcode. The barcode scanner 805 interprets the emitted pulses of light as light reflected from a barcode for the corresponding coupon.

If there are several coupons, the user may instruct the cellular telephone 700 to provide the module 500 with analog signals for the next coupon after a coupon has been read by the barcode scanner. Most barcode scanners provide a signal (e.g., an audible) beep to signify a successful read. This sequence of steps may be repeated until each coupon has been used.

Alternatively, the transmission of a series of synthetic barcodes may be automated. The phone 700 may be configured to automatically send the next analog signal stream corresponding to the next coupon according to a time schedule (e.g., 5 seconds apart) or based upon detection (e.g., audible detection) of a positive scan. Many scanners emit a distinctive beep (e.g., a 4 kHz 100 ms beep) that may be audibly detected by the phone 700 to indicate a successful scan. Upon sensing a beep indicative of a positive read, the phone may proceed with the next transmission.

In sum, the invention provides an easy-to-use paperless wireless coupon on demand system that works with conventional laser barcode scanners. Coupons may be wirelessly retrieved, selected, and optically transmitted at any checkout lane equipped with a laser scanner.

In another embodiment, the phone 700 includes a display 710 that is readable by a human, as shown in FIG. 7. In operation, the display 710 may display one or more alphanumeric codes and/or an image pertaining to the coupon being transmitted.

Those skilled in the art will appreciate that a synthetic barcode coupon system and method according to principles of the invention may be utilized in many different industries, i.e., anywhere information is communicated to a laser barcode scanner. By way of example and not limitation a synthetic barcode module according to principles of the invention, because of its compact configuration, may be applied to any transaction or event requiring a barcode readable by a laser scanner.

An inherent advantage is that the primary readout technology (i.e., a barcode scanner) is ubiquitous and inexpensive. Another advantage is that the input interface and form of analog input is widely available. Yet another advantage is that the encoded information (e.g., coupon barcode data) is communicated optically. Yet another advantage is that the information may be updated and replaced using communication capabilities of the phone. Still another advantage is that vast amounts of data may be stored on the phone. Furthermore, because of its compact configuration, a synthetic barcode module may be carried by a user at all times. Moreover, the total cost of ownership of such modules can be relatively low because the hardware components (e.g., an LED, a signal conditioner, a microcontroller and an LED driver) are all inexpensive and widely available.

Figure 11:
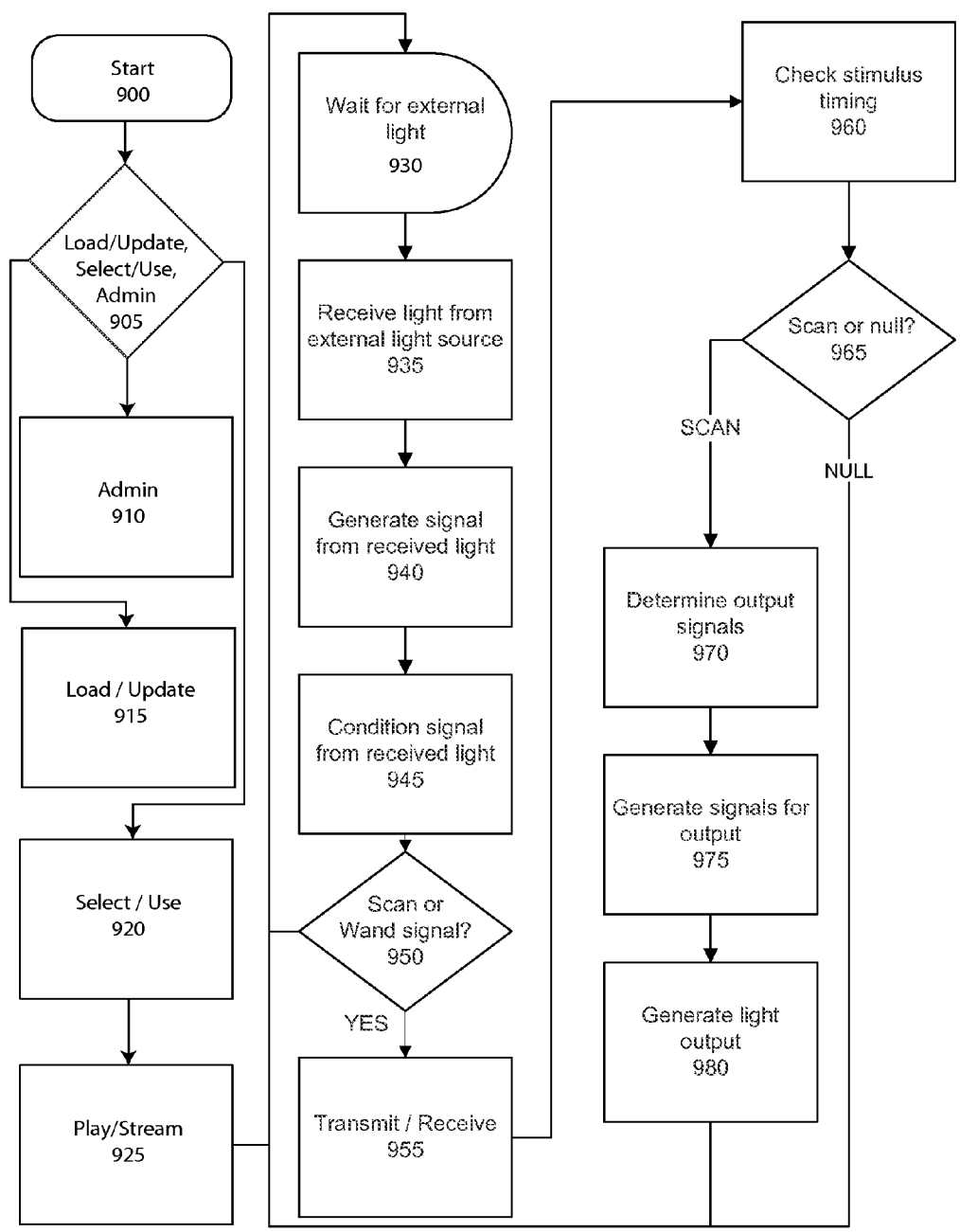
FIG. 11 is a high level flowchart that conceptually illustrates steps of an exemplary synthetic barcode method according to principles of the invention.
Figure 14:
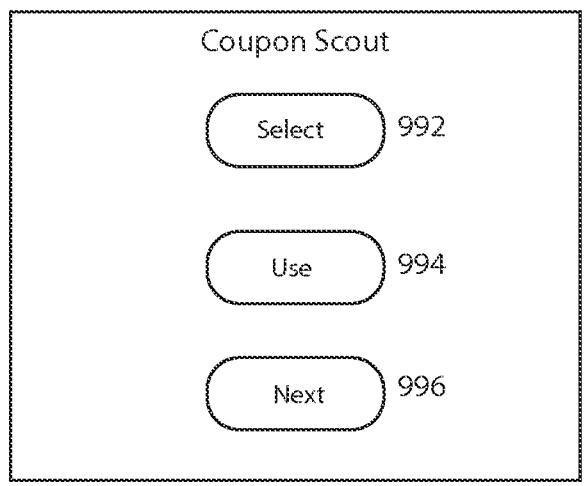
FIG. 14 is a schematic diagram that conceptually illustrates another aspect of a graphical user interface for an exemplary synthetic barcode coupon client application according to principles of the invention.

Referring now to FIG. 11, a high level flowchart of steps of an exemplary synthetic barcode method according to principles of the invention is conceptually shown. The method starts in step 900 by launching a client application, such as an application on a mobile phone, and providing instructions via a user interface in step 905. Upon launching the application, a user is presented with a user interface as conceptually illustrated in FIG. 12. User selectable commands include Load/Update 980, Select/Use 982 and Admin 984. One type of command is Admin 984 for administration 910. Upon receiving an administration instruction, the application provides controls for account management (e.g., setting user passwords) 997, subscription information 998 and help and setting program preferences 999, as shown in FIG. 14.

Account management functions include settings and parameters related to a user's account. By way of example, controls for changing passwords and user names associated with the application and an account may be provided.

Subscription functions allow a user to identify manufacturers, products, and/or remote online sources for which or from which coupon data is collected. By way of example and not limitation, a user may subscribe to all coupons from a manufacturer of breakfast cereal, or the user may subscribe to coupons from the manufacturer for a particular breakfast cereal. The application will either directly find and retrieve coupon data corresponding to the subscriptions or will receive data streams from a remote application running on a web server. A search function may also be provided to enable a user to search for a source of coupons for a particular type of product or a particular brand of product. A browse function may provide a menu that enables a user to browse for coupons according to product and/or manufacturer and/or brand categories. For example, a user may browse for coupons for cereals, coupons for products manufactured by a particular cereal manufacturer or coupons for a particular brand of cereal.

Help/program preferences relate to the user interface and data storage aspects of the application. One preference may be where to store coupon data on the mobile phone. Another preference may be a limit on storage, such as a maximum amount of coupon data that may be stored and/or a maximum amount of time to maintain coupon data stored on the phone. Other preferences may include configuration of audible signals. Yet other preferences may include set up of parameters for communication with remote sources of coupon data.

Figure 12:
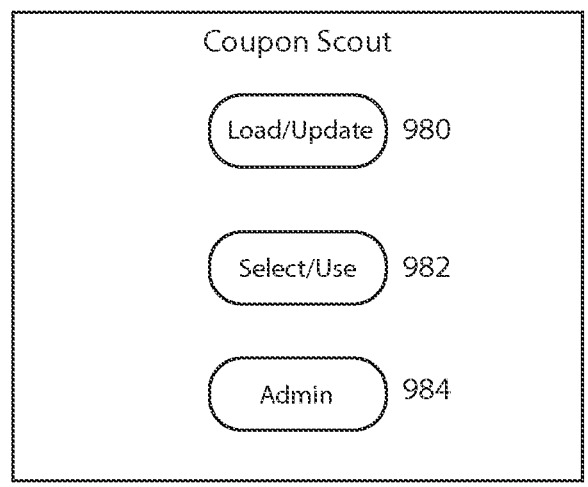
FIG. 12 is a schematic diagram that conceptually illustrates another aspect of a graphical user interface for an exemplary synthetic barcode coupon client application according to principles of the invention.
Figure 13:
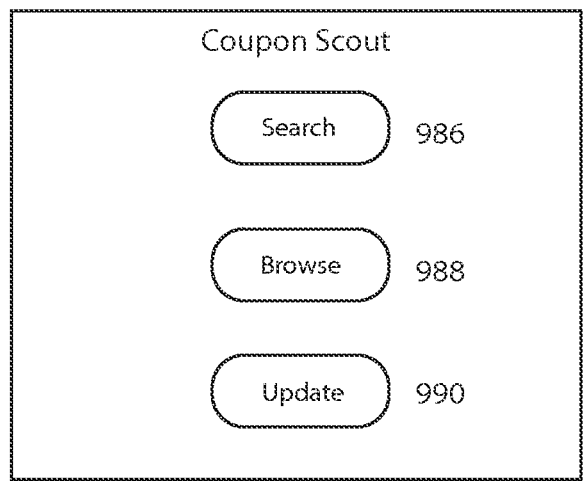
FIG. 13 is a schematic diagram that conceptually illustrates another aspect of a graphical user interface for an exemplary synthetic barcode coupon client application according to principles of the invention.

After completion of administration functions control passes back to the start 900. A user may load/update coupon data as in step 915 by selecting the load/update command 980 (FIG. 12). Load/update functions include search 986, browse 988 and update 990 (FIG. 13). Search 986 allows a user to search for and select and/or subscribe to coupons using keywords. Browse 988 allows a user to browse for and select and/or subscribe to available coupons according to product type, manufacturer and/or brand. Update 990 allows a user to request any updated coupon data for the products, manufacturers, and brands to which the user subscribed. The coupon data may be communicated via and means of communication compatible with the phone 700.

After completion of the load/update functions control passes back to the start 900. A user may select and use available coupon data as in step 920 by selecting the select/use command 982 (FIG. 12). The select and use functions include a select command 992 that places selected available coupon data in a queue for transmission to the module 500 (FIG. 14). The use command 994 begins the transmission process. The next command 996 instructs the application to transmit the next coupon data from the queue.

Step 925 entails playing an audio file corresponding to a barcode. Playing may be accomplished using any compatible media playing application or module. Upon being played, analog audio signals are output. The analog signals correspond to the barcode. The module receives the analog signals and generates optical driver signals to optically emulate the barcode.

Steps 930 to 980 comprise steps of an exemplary transmission process. As an initial step, the module 500 waits to receive light from an external source, as in step 930. To conserve power, a system implementing the method may sit idle until light is received, i.e., until interrogated. Light is received from an external source, which may include laser light emanating from a barcode reader or ambient light emitted from other nearby light sources, as in step 935. The light may be collected by a light transmission means such as a light pipe, lens or mirror, and then transmitted to an optical sensor, which may be an LED used also as an emitter or may be a separate photo receiver. Next, the sensor generates a signal corresponding to the received light, as in step 940. A signal conditioner receives and conditions the signal from the sensor by improving the signal to noise ratio and supplying logic level signals to a microcontroller, as in step 945.

The system discriminates between a scanning signal and a signal from another source of light. First, the system is configured to discriminate a signal corresponding to a laser pulse of a barcode scanner from signals generated by other light sources, such as ambient light, based upon signal characteristics, such as stimulus timing or voltage rise time, as in step 950. If the signal does not correspond to a signal from a scanner, then control returns to step 600. However, if a signal corresponds to a signal from a scanner, then control proceeds to subsequent steps. Optionally, the discrimination step comprises receiving light pulses as in step 955. In step 960, stimulus timing is checked. That entails determining if the signal being received has a regular or determined pulse rate. For example, laser scanners scan a laser beam back and forth across a bar code. The scanning rate is typically fixed at about 100 scans per second (or more) for a particular laser scanner. To the module 500, the scanning laser of a barcode scanner will appear as a light pulse recurring in regular fixed intervals of time (e.g., once every 0.01 seconds). Thus, light from a barcode scanner may be readily distinguished by determining if the light pulse is repeatedly detected at a fixed frequency (i.e., at a fixed amount of time between detected light pulses). If the light received does not correspond to a barcode scanner, then step 965 passes control back to step 930.

Based upon the stimulus timing, such as pulse rates or frequencies, a determination is made if the emitting unit is a barcode scanner or not as in step 965. For a scanner, control proceeds to scanning mode steps 970-980. In scan mode, the received light prompts the system to emit optical output for a scanner/reader to read. If the signal does not correspond to a signal from a scanner, then in "null mode" control returns to step 930. Null mode may be triggered due to any ambient or incompatible light source. Thus, unless and until signal characteristics correspond to a compatible scanner, the module will not communicate data.

In scan mode, a programmed microcontroller receives the conditioned signals and determines output signal stream(s), as in step 970. An LED driver receives the signals that are output from the microcontroller and supplies a correct amount and timing of drive current to an LED light source to emulate light reflected from a determined scanned barcode, as in step 975. The LED light source receives the drive current from the LED driver and emits light to emulate light reflected from a determined scanned barcode, as in step 980. Advantageously, in a particular exemplary embodiment of the invention, the device that emits the light in step 980 may be an LED and the same device (i.e., same LED) used to sense the light and generate a signal from the received light in steps 955. As another advantage, in another particular exemplary embodiment, one or more light pipes may facilitate the capture (i.e., receipt) and transmission of light from an external source, as in step 955.

Figure 15:
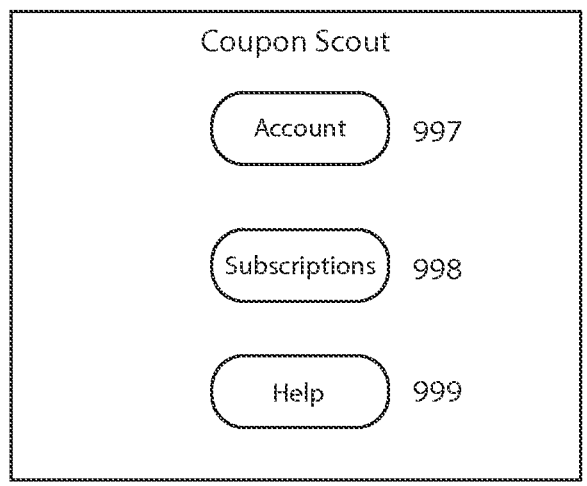
FIG. 15 is a schematic diagram that conceptually illustrates another aspect of a graphical user interface for an exemplary synthetic barcode coupon client application according to principles of the invention.
Figure 16:
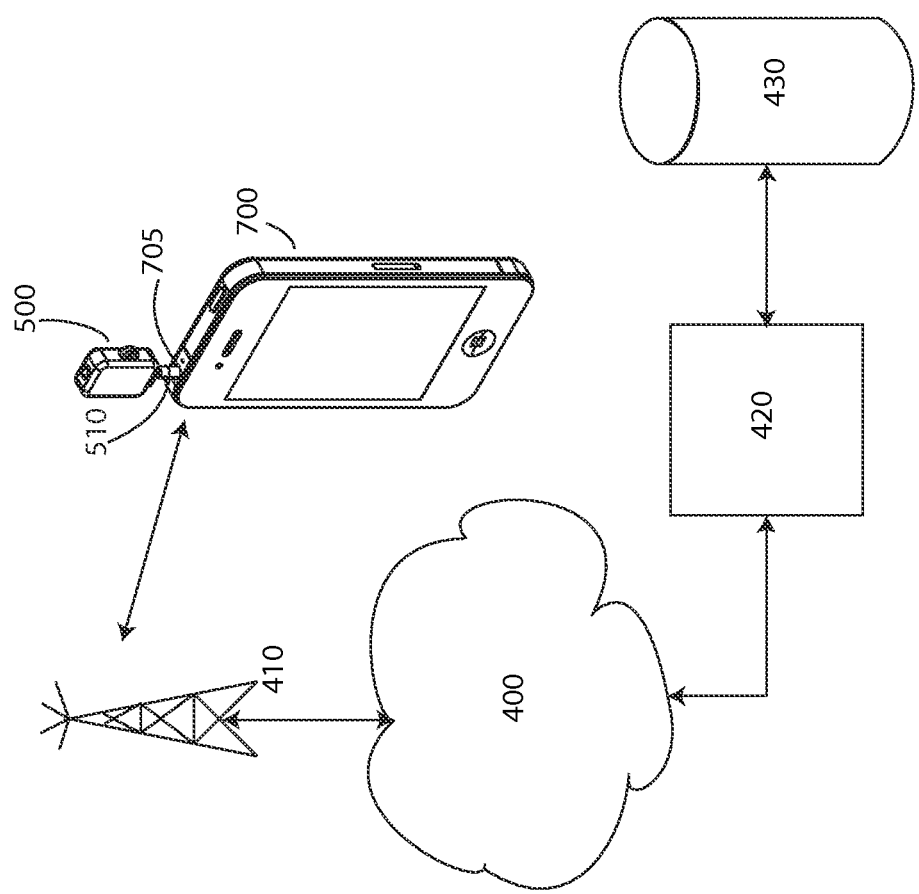
FIG. 16 provides a high-level block diagram that conceptually illustrates components of an exemplary synthetic barcode coupon system according to principles of the invention.

Referring now to FIG. 16, a high-level block diagram of a system in accordance with an exemplary implementation of the invention is shown. A server 420 hosts software for managing coupon data on a data store 430 and enabling such data to be communicated to various end user devices such as a cellular phone 700. While FIG. 15 shows one server 420 and one end user device 700, it is understood that the system may include any number of servers and end user devices. Additionally, a server may comprise a standalone computer or a plurality of operably coupled computing devices. The invention is in not limited to the exemplary networked system shown in FIG. 15.

Coupon data may be communicated from the server 420 using any compatible communication means, such as network connection via a LAN, WAN or the Internet 400, RF communication such as cellular telephone communication 410, or other means of wired or wireless communication. In one embodiment, the data may be communicated to an end-user's personal computer, to which the end user's device (e.g., phone 700) may be synchronized, thus receiving the data. In another embodiment, the data may be communicated from the server 420 via the network to the end user device 700.

The server and personal computers described above may be comprised of commercially available computers, hardware and operating systems. Indeed, the aforementioned computing devices are intended to represent a broad category of computer systems capable of functioning in accordance with the present invention. Of course, the computing devices may include various components, peripherals and software applications provided they are compatible and capable of performing functions in accordance with the present invention. The computing devices also include information, documents, data and files needed to provide functionally and enable performance of methodologies in accordance with an exemplary embodiment of the invention.

A firewall may be located between computers to protect against corruption, loss, or misuse of data. The firewall may limit access and prevent corruption of sensitive data. Thus, a server may be configured/authorized to access and receive only data that is necessary for the legitimate functions of the server. The firewall may be comprised of any hardware and/or software suitably configured to provide limited or restricted access to a computer. The firewall may be integrated within the computer or comprise another system component, or may reside as a standalone component.

Figure 17:
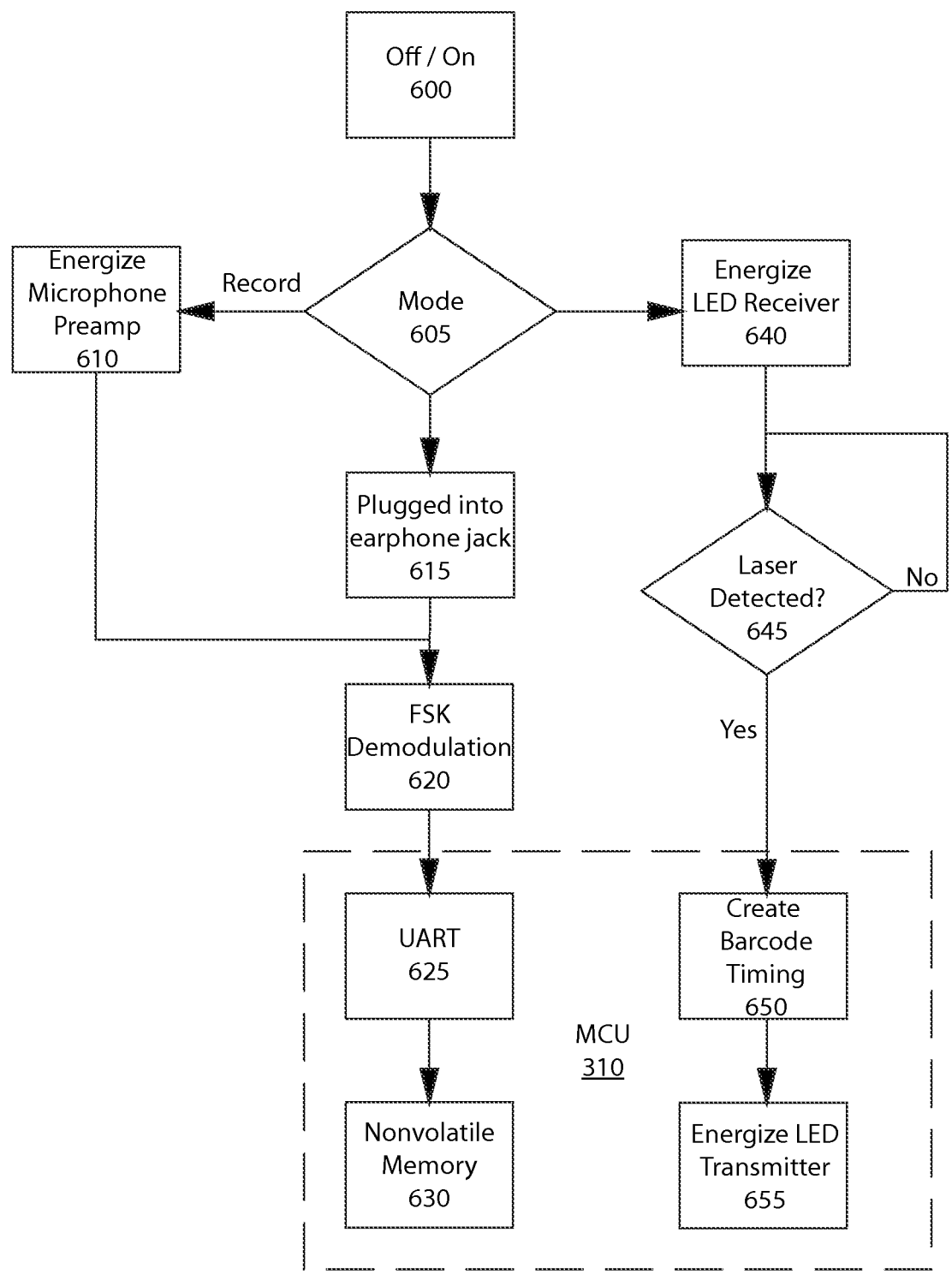
FIG. 17 is a high level flowchart that conceptually illustrates modes of operation of an exemplary synthetic barcode module according to principles of the invention.

Now referring to FIG. 17, a flow chart that conceptually illustrates modes of operation of a synthetic barcode module according to principles of the invention is provided. An input mode, steps 610-630, entails transforming analog audio input into optical output data. An output mode, steps 640-655, entails generating optical output based upon the optical data when a barcode scanner has been detected. In step 600, a synthetic barcode module according to principles of the invention is activated or awaken from sleep or hibernation mode. Activation or awakening may be accomplished by user selection of a switch (e.g., a power on switch) or sensing that the module has been plugged into an audio output jack of a compatible device. When the module is activated, steps of the input mode or output mode may proceed, as illustrated in step 605.

In input mode, analog audio input may be received from an energized microphone preamp, as in step 610, or from an audio output jack, as in step 615. In the case of microphone input 610, the synthetic barcode module or the compatible device (e.g., phone) may be equipped with a microphone and preamp circuitry. If the module is equipped with a microphone, the microphone may be communicatively coupled to the microcontroller. If the compatible device is equipped with a microphone, recorded output may be communicated to the module via the audio output jack. The analog audio input comprises modulated audio, such as, but not limited to, frequency modulated audio according to a frequency-shift keying (FSK) modulation scheme in which digital information is transmitted through discrete frequency changes of a carrier wave. The analog audio input is demodulated in step 620, such as by FSK demodulation or another demodulation methodology that is compatible with the modulated analog audio input. In step 625, a Universal Asynchronous Receiver/Transmitter (UART) assembles demodulated bits of data into complete bytes. The bytes of data constitute optical timing data.

In output mode, the LED is used as a receiver, as in step 640. While an LED is generally not an efficient photocell, in the presence of a laser scanner an LED will produce a sensible signal, e.g., enough microamps at enough volts to operate an amplifier or logic gate. Using the LED as a photocell, the module detects the presence of a laser scanner. By way of example, an HeNe laser found in older laser barcode scanners and a laser diode used in modern barcode scanners have an operation wavelength ($\lambda$) of about 630 to 650 nm, in the red portion of the visible spectrum. A Super High Brightness Red LED, which emits pure red to He-Ne laser red light, with a peak wavelength ($\lambda$) between 650 and 670 nm, may be sensitive to red light from such a laser barcode scanner. An infrared LED may be used to sense light emitted from and emulate light reflected to an IR barcode scanner. If sensed light is not light from a laser barcode scanner, control returns to step 645. If sensed light is light from a laser barcode scanner, the microcontroller supplies a correct amount and timing of drive current, as in step 650, to energize an LED light source, as in step 655, to emit light that emulates light reflected from a barcode.

The invention offers several advantages. One advantage of the invention is that the synthetic barcode module 500 may communicate a wide range of data from an end user device such as a cellular phone to any compatible barcode scanner. Various sets of data may be stored and communicated sequentially. By way of example and not limitation, a synthetic barcode module may communicate an id for the end user as well as other information about that end user, in addition to coupon data. Versatility is another advantage. The synthetic barcode module is adaptable to environments equipped with barcode scanners.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A synthetic barcode module comprising:
   a light management module configured to produce output signals corresponding to received light pulses, emit light pulses that emulate light reflected from a scanned barcode in scan mode, and emit light pulses that enable optical bidirectional communication in programming mode, said light management module comprising an LED operating as both an optical receiver and an optical emitter, wherein the LED receives light pulses, produces output signals corresponding to the received light pulses, and emits light pulses; and
   a controller module that receives analog audio signals corresponding to at least one barcode, receives said output signals corresponding to received light pulses, determines if the received light pulses correspond to a barcode scanner, and outputs driver signals to cause the light management module to emit the light pulses that emulate light reflected from the scanned barcode to communicate the at least one barcode to the barcode scanner; and
   an analog audio interface configured to communicatively couple the controller to an analog audio output jack of a computing device.

2. A synthetic barcode module according to claim 1, wherein said controller module determines if the received light pulses correspond to the barcode scanner by checking stimulus timing.

3. A synthetic barcode module according to claim 2, wherein said controller module determines if the received light pulses correspond to the barcode scanner by checking stimulus timing by determining if the timing of received light pulses corresponds to a barcode scanner.

4. A synthetic barcode module according to claim 1, wherein the analog audio interface comprises a male audio plug.

5. A synthetic barcode module according to claim 1, wherein the at least one barcode comprises a barcode of a coupon.

6. A synthetic barcode module according to claim 1, said synthetic barcode module further comprising a housing, said housing containing the controller module.

7. A synthetic barcode module according to claim 6, said synthetic barcode module further comprising a keychain attachment means connected to the housing.

8. A synthetic barcode module according to claim 1, said synthetic barcode module further comprising a battery power supply.

9. A synthetic barcode module according to claim 1, said computing device comprising a cellular telephone.

10. A coupon management system, said system comprising:
    a synthetic barcode module comprising:
    a light management module that produces output signals corresponding to received light pulses, emits light pulses that emulate light reflected from a scanned barcode in scan mode, and emits light pulses that enable optical bidirectional communication in programming mode, said light management module comprising an LED operating as both an optical receiver and an optical emitter, wherein the LED receives light pulses, produces output signals corresponding to the received light pulses, and emits light pulses; and
    a controller module that receives analog audio signals corresponding to at least one barcode data field, receives said output signals corresponding to received light pulses, determines if the received light pulses correspond to a barcode scanner, and outputs driver signals to cause the light management module to emit the light pulses that emulate light reflected from a scanned barcode to communicate the at least one coupon code optically to the barcode scanner; and
    an analog audio interface configured to communicatively couple the synthetic barcode module to a mobile computing device; and
    a mobile computing device communicatively coupled to the synthetic barcode module via a data interface, said mobile computing device having nonvolatile storage for storing the at least one coupon code, a user input device for user control, and a communication means for receiving the at least one coupon code from a remote source.

11. A coupon management system according to claim 10, wherein the analog audio interface comprises an analog audio plug.

12. A coupon management system according to claim 10, said mobile computing device comprising a cellular telephone.

13. A coupon management system according to claim 12, said mobile computing device comprising a cellular telephone and said communication means for receiving the at least one coupon code from a remote source comprising a wireless cellular communication subsystem.

14. A coupon management system according to claim 13, further comprising a client application executable on said mobile computing device, said client application managing user selection and use of the at least one coupon code.

15. A coupon management system according to claim 14, said client application further controlling transmission of coupon code from the mobile computing device to the synthetic barcode module via the interface.

16. A coupon management system according to claim 15, wherein the at least one coupon code comprises a plurality of coupon codes in a queue on the cellular telephone, and said client application provides a function for a user to control sending a next coupon code in the queue from the cellular telephone to the module.

17. A coupon management system according to claim 15, wherein the cellular telephone includes a microphone, and the client application is configured to detect, via said microphone, an audible signal corresponding to a successful scan.

18. A coupon management system according to claim 17, wherein the at least one coupon code comprises a plurality of coupon codes in a queue on the cellular telephone, and said client application provides controls sending a next coupon code in the queue from the cellular telephone to the module upon detecting the audible signal corresponding a successful scan.

19. A coupon management system according to claim 17, wherein the at least one coupon code comprises a plurality of coupon codes in a queue on the cellular telephone, and said client application sends a next coupon code in the queue each time an audible signal corresponding to a successful scan is sensed, until all coupon codes in the queue have been sent.

20. A coupon management system according to claim 12, further comprising a client application executable on said mobile computing device, said client application providing a search tool configured to search for available coupon codes from at least one remote source.

\* \* \* \* \*